US007405721B2

(12) United States Patent
Tachibana

(10) Patent No.: US 7,405,721 B2

(45) Date of Patent: Jul. 29, 2008

(54) LIQUID CRYSTAL DISPLAY DEVICE

(75) Inventor: Tadayoshi Tachibana, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 205 days.

(21) Appl. No.: 10/463,606

(22) Filed: Jun. 18, 2003

(65) Prior Publication Data

US 2004/0041782 A1 Mar. 4, 2004

(30) Foreign Application Priority Data

Jun. 18, 2002 (JP) ............................ 2002-176539

(51) Int. Cl.
*G09G 3/36* (2006.01)
*G02F 1/1335* (2006.01)

(52) U.S. Cl. ........................................ 345/102; 349/61

(58) Field of Classification Search .................. 345/60, 345/73-75, 102, 211, 204; 349/61, 69, 70; 315/102, 158, 219

See application file for complete search history.

(56) References Cited

U.S. PATENT DOCUMENTS 4,495,445 A * 1/1985 Turney ...................... 345/75.1
5,818,172 A * 10/1998 Lee ............................ 315/86
5,844,540 A * 12/1998 Terasaki ..................... 345/102
5,907,222 A * 5/1999 Lengyel et al. ............. 315/158
6,856,519 B2 * 2/2005 Lin et al. .................... 315/307

FOREIGN PATENT DOCUMENTS

JP 02 010698 1/1990

* cited by examiner

*Primary Examiner*—Sumati Lefkowitz
*Assistant Examiner*—William L Boddie
(74) *Attorney, Agent, or Firm*—Reed Smith LLP; Stanely P. Fisher, Esq.; Juan Carlos A. Marquez, Esq.

(57) ABSTRACT

According to the present invention, in a liquid crystal display device which intermittently drives (burst driving) a light source device having a discharge tube which is arranged to face a main surface of a liquid crystal display panel in an opposed manner and is turned on in response to an alternating electric field, the resistance between first and second active elements which constitute a resonance circuit at a primary side of a driving circuit of the light source device and the reference potential in the driving circuit is set higher when burst driving of the discharge tube assumes the turn-OFF state than when the burst driving of the discharge tube assumes the turn-ON state. Due to such a constitution, it is possible to lower the luminance when the burst driving is in the turn-OFF state than when the burst driving is in the turn-ON state without extinguishing the discharge tube when the burst driving is off whereby it is possible to suppress blurring of motion picture s whereby blurring of the motion picture can be suppressed and luminance of the image can be increased.

14 Claims, 6 Drawing Sheets

LIQUID CRYSTAL DISPLAY DEVICE

BACKGROUND OF THE INVENTION

1. Field of the Invention

The present invention relates to a liquid crystal display device, and more particularly to a structure of a light source device which is suitable for suppressing blurring of a profile of a motion picture (an animated image) displayed on a liquid crystal display panel provided to the liquid crystal display device and for ensuring luminance of a display screen thereof.

2. Description of the Related Art

Recently, mounting of a liquid crystal display device (liquid crystal display module) to a video equipment which displays a so-called motion picture such as a television receiver set or the like has been studied and the movement to sell these equipment in place of video equipment using cathode ray tubes such as Brown tube or the like is actively in progress.

However, compared to the cathode ray tube which displays an image on a screen as an impulse, in the liquid crystal display device which holds an image on the screen every frame period, a profile of an object which moves in the screen every frame period cannot be completely erased every frame period and a strip-like blur is generated along the profile.

On the other hand, a technique which erases an image of previous one frame period from a visual field of a user of the video equipment by periodically turning off a light source device (known as a backlight) which is provided to the liquid crystal display device for every frame period has been studied. Such a technique is described in Japanese Unexamined Patent Publication 2001-108962, Japanese Unexamined Patent Publication 2001-125066 and Japanese Unexamined Patent Publication 2002-123226, respectively. That is, these publications describe the technique which extinguishes a light source of a liquid crystal display device for a fixed period every frame period. However, in this case, since the irradiation of light to a liquid crystal display panel has to be stopped for the fixed period, the luminance of a display screen is lowered. Further, in a light source which irradiates light from an ionized gas generated in a bulb such as a cold cathode fluorescent lamp, a xenon lamp, a fluorescent lamp or the like (hereinafter referred to as "a discharge tube"), due to delay in increasing/decreasing of a light emitting quantity in response to a turn-ON/turn-OFF control of supplying of a lamp current to the discharge tube, even when a light source device provided with the discharge tube is made to perform a blinking operation, a contrast ratio of an image displayed by the liquid crystal display panel is not sufficiently enhanced.

On the other hand, a burst operation method which controls a light emitting quantity by turning on or off a light source device at a period shorter than a frame period is discussed in Japanese Unexamined Patent Publication 11(1999)-299254 and Japanese Unexamined Patent Publication 2000-78857. That is, Japanese Unexamined Patent Publication 11(1999)-299254 describes a technique in which voltage pulses are picked up intermittently from a group of voltage pulses supplied to a driving circuit of a discharge tube in response to burst signals, while Japanese Unexamined Patent Publication 2000-78857 describes a technique in which an alternating electric field which is applied to a discharge tube is intermittently oscillated in response to burst signals. The alternating electric field denotes an electric field having alternating polarity in an extension direction of lines of electric force thereof even if no current appears in the direction.

SUMMARY OF THE INVENTION

To increase a contrast ratio of motion picture s in a liquid crystal display device, inventors of the present invention have inputted burst signals to a dimming circuit provided to a light source driving circuit and have intermittently supplied a lamp current to a discharge tube in response to burst signals during lighting periods in a blink operation of a light source device. According to such a trial carried out by the inventors, a period for inputting image data amounting to one frame period to a liquid crystal panel is divided into a lighting period and an extinguishing period, and a burst ON time and a burst OFF time are repeated plural times respectively during the lighting period.

In this manner, it is possible to compensate for lowering of luminance of the display screen attributed to extinguishing of light source device every frame period during the lighting period. However, it is impossible to compensate for lowering of a light radiation quantity to a liquid crystal display panel during a plurality of burst OFF periods included in the lighting time without damaging a contrast ratio of a display image during a plurality of burst OFF periods. The first reason is that when a discharge tube is used as the light source device, it is impossible to hold the discharge during the burst OFF periods and a state similar to the state of the extinguishing of light is generated during the lighting time. The second reason is that in a transitional stage from the burst OFF period to the burst ON period, a given time is necessary for restarting the stationary discharge in the inside of the discharge tube in a light extinguished state and hence, the luminance of the discharge tube in the lighting period cannot be univocally controlled (difficult to adjust to a desired luminance) based on a ratio (duty ratio) between the burst ON time and the burst OFF time.

With respect to the second reason, when a lamp current supplied to the discharge tube during the burst ON period is increased, a given time necessary for acquiring the stationary discharge is also increased and, further, unexpected noises (also referred to as abnormal sound) may arise from a light source driving circuit. Particularly, the latter noises are considered to give a discomfort to a user of the liquid crystal display device.

In view of these technical drawbacks, it is an object of the present invention to provide a light source driving circuit and a driving method of the circuit which are suitable for intermittently operating a light source device provided to a liquid crystal display device.

According to a typical example of the liquid crystal display device of the present invention, (a) the liquid crystal display device includes a liquid crystal display panel, a light source device arranged to face one main surface of the liquid crystal display panel and having a discharge tube which is driven by an alternating electric field, and a light source driving circuit which generates the alternating electric field, (b) the light source driving circuit includes a primary side circuit which generates the alternating voltage by intermittently receiving a direct voltage (e.g. a direct-current voltage), a transformer circuit which boosts the alternating voltage (e.g. a alternating-current voltage) generated by the primary side circuit and outputs the boosted alternating voltage, and a secondary side circuit which applies the alternating voltage outputted from the transformer circuit to the discharge tube, (c) the first primary side circuit includes first and second active elements (switching elements, for example) which control an electric current generated between respective end portions of the transformer circuit and the reference potential side with respect to the direct current, and a third active element and a passive element (a resistance element or an impedance, for example) which are arranged in parallel between the first and second active elements and the reference potential, and (d) the passive element exhibits the resistance which is higher than the resistance of a current path when the third active element is in a turn-turn-ON state and lower than the resistance of the current path when the third active element is in a turn-OFF state.

The alternating voltage referred in the above definition denotes "a voltage whose potential gradient is inverted periodically" even if no current appears in a space where the voltage is generated.

The liquid crystal display device according to the present invention may be further provided with following functional or structural features.

The first feature lies in that the first and second active elements are made to assume the turn-ON state alternately.

The second feature lies in that the direct voltage is intermittently generated in response to control signals and a turn-ON/turn-OFF control of the third active element is also performed in response to these control signals. In this case, the control signals may be generated in response to image forming timing in the liquid crystal display panel or signals which control the image forming timing (vertical synchronizing pulses or frame starting signals, for example).

The third feature lies in that the third active element is made to assume the turn-ON state when the direct voltage is applied to the primary side circuit and is made to assume the turn-OFF state when the direct voltage is not applied to the primary side circuit.

The manner of operation and advantageous effects of the present invention which are described heretofore and the detail of preferred embodiments of the present invention will become apparent from the explanation described later.

BRIEF DESCRIPTION OF THE DRAWINGS

FIG. 1(A) to FIG. 1(D) relate to an embodiment 1 of a liquid crystal display device according to the present invention, wherein FIG. 1(A) is a circuit block diagram showing the detail of a light source driving circuit DRV shown in FIG. 7, FIG. 1(B) is an explanatory view of an NPN type bipolar transistor constituting switching elements T1, T2, T3 of the circuit block, FIG. 1(C) is a simplified band diagram for explaining an operation of the NPN type bipolar transistor, and FIG. 1(D) is an explanatory view of the PNP type bipolar transistor;

FIG. 2(A) and FIG. 2(B) show inverter circuits (resonance circuits) of the light source driving circuit DRV shown in FIG. 1(A) in an enlarged form, wherein FIG. 2(A) shows the inverter circuit provided to the liquid crystal display device of the embodiment 1 of the present invention and FIG. 2(B) shows the conventional inverter circuit.

FIG. 3(A) and FIG. 3(B) show control waveforms of a blink operation of the light source device of the liquid crystal display device, wherein FIG. 3(A) is a waveform chart when a discharge tube is subjected to burst driving during a lighting period of the light source device and FIG. 3(B) is a waveform chart when the discharge tube is continuously lit during the lighting period;

FIG. 4(A) and FIG. 4(B) show waveforms of a lamp voltage $V_L$ and a lamp current $I_L$ generated in the discharge tube which is subjected to burst driving, wherein FIG. 4(A) is a waveform chart when the burst driving is performed by the inverter circuit of the present invention (see FIG. 2(A)) and FIG. 4(B) is a waveform chart when the burst driving is performed by the conventional inverter circuit (see FIG. 2(B));

FIG. 5(A) to FIG. 5(E) relate to an operation of the light source driving circuit DRV (see FIG. 1(A)) of the liquid crystal display device of the present invention, wherein FIG. 5(A) is a waveform chart showing a voltage waveform Vpgen which is outputted from a pulse shaping circuit to the switching element T3, FIG. 5(B) is a waveform chart showing an emitter voltage $V_{EMIT}$ (voltage Vb at a point b) of the switching elements T1 and T2, FIG. 5(C) is a waveform chart showing a base voltage $V_{BASE}$ of either one of the switching elements T1 and T2, and FIG. 5(D) is a waveform chart of the potential difference (lamp voltage) $V_L$ generated in the discharge tube LP, and FIG. 5(E) is a waveform chart of an electric current (lamp current) $I_L$ generated in the discharge tube LP;

DETAILED DESCRIPTION

Figure 1A:
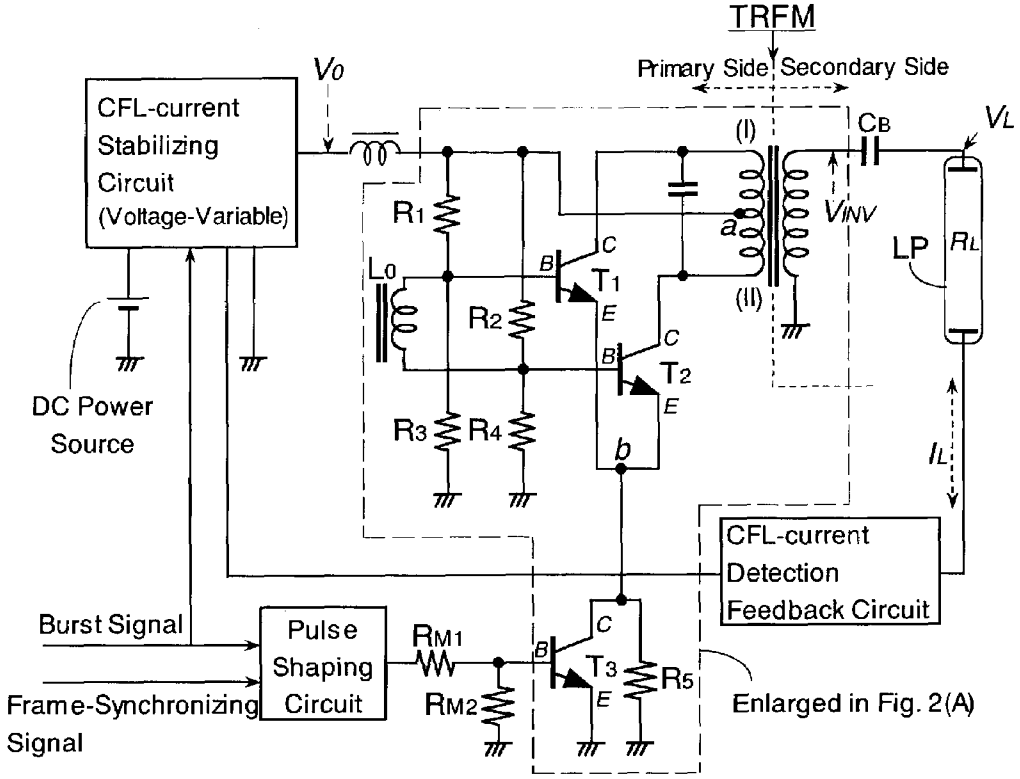

Preferred specific embodiments of the present invention are explained hereinafter in conjunction with relevant drawings. In the drawings which are referred in the following explanation, part having the same function are given same numerals and the repeated explanation of these parts will be omitted.

Embodiment 1

A liquid crystal display device of this embodiment is explained in conjunction with FIG. 1 to FIG. 8.

Figure 7:
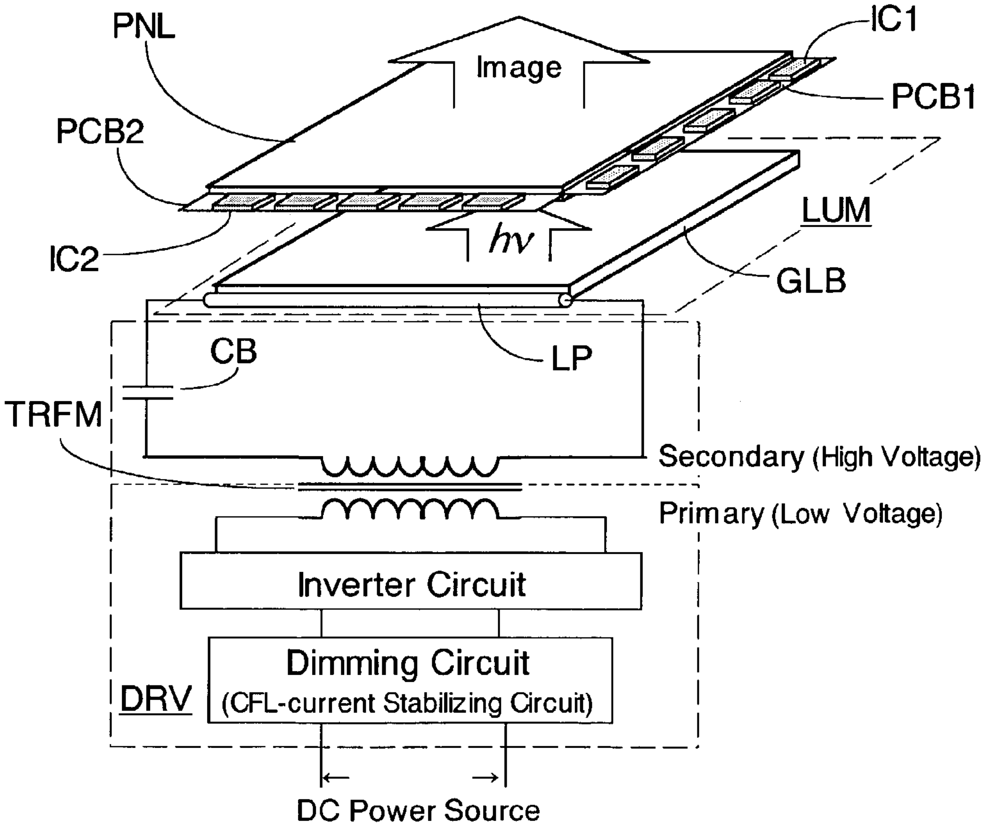
FIG. 7 is a schematic view for showing an outline of the liquid crystal display device of the embodiment 1.

FIG. 7 is a schematic view showing an outline of a liquid crystal display device of this embodiment. The liquid crystal display device of this embodiment includes a liquid crystal display panel PNL, a light source device LUM having a discharge tube LP which is arranged to face one main surface of the liquid crystal display panel and is driven by an alternating electric field, and a light source driving circuit DRV which generates the alternating electric field. Mounting parts and the like which are necessary for completing a product such as a liquid crystal display module or the like by assembling these elements are omitted in FIG. 7.

As shown in FIG. 7, the light source driving circuit DRV is divided into a primary side circuit which receives a direct current from outside in a state that a transformer TRFM constitutes a border and converts the direct current into an alternating current, and a secondary side circuit which gives a voltage amplitude corresponding to starting of discharge at the discharge tube LP to an alternating current generated by the primary side circuit and supplies this voltage amplitude to the discharge tube LP. In this embodiment, as the discharge tube LP, a cold cathode fluorescent lamp (also abbreviated as "CFL" hereinafter) is used.

The primary side circuit adjusts the electric current received from the direct-current power source in response to the light emitting luminance of the discharge tube LP using a dimming circuit, superposes an alternating voltage waveform to the electric current inputted to an inverter circuit from the dimming circuit, and inputs the current to a primary side coil of the transformer TRFM. In the transformer TRFM, upon receiving the electromagnetic conduction of the primary side coil, an alternating current of high voltage is generated in a secondary side coil. Although the alternating current generated in the secondary side coil is supplied to the discharge tube LP, in a process from starting of discharge (so-called starting of lighting) in the inside of the discharge tube LP to self-sustaining of discharge (holding the lit state), a lamp voltage (potential difference generated between electrodes of the discharge tube LP) and a lamp current (current generated between electrodes of the discharge tube LP) are largely changed. To ensure the stable operation of the secondary side circuit of the light source driving circuit DRV against such change of voltage and current, the secondary side circuit is provided with a stabilizing element. In the light source driving circuit DRV shown in FIG. 7, a capacitive element (also referred to as "ballast capacitor) CB is used as a stabilizing element.

On the other hand, the light source device LUM shown in FIG. 7 has a so-called edge-light type structure which includes the discharge tube LP and a light guide plate GLB which receives light from the discharge tube LP on a side surface thereof and radiates light from one of main surfaces thereof. In this structure, as the name exactly puts it, with respect to the main surface of the liquid crystal display panel PNL which faces the light source device in an opposed manner, the position of the discharge tube LP is shifted sideway. The light source device LUM may be, in place of this edge light type, formed in a so-called direct backlight structure which makes the discharge tube LP face the main surface of the liquid crystal display panel PNL in an opposed manner.

The liquid crystal display panel PNL shown in FIG. 7 has two neighboring sides thereof connected with printed circuit boards PCB1, PCB2 and respective printed circuit boards are provided with a plurality of driving elements IC1, IC2 which control the operation of a plurality of pixels formed in the liquid crystal display panel PNL.

Figure 1B:
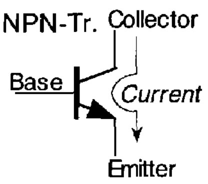
Figure 1C:
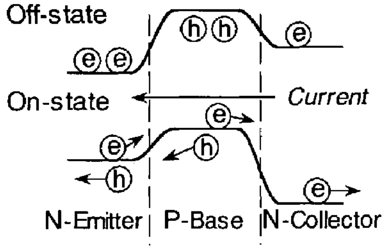
Figure 1D:
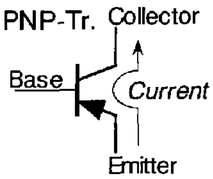

FIG. 1(A) is a circuit block diagram which shows the detail of the light source driving circuit DRV shown in FIG. 7, and FIG. 1(B) is an explanatory view of an NPN-type bipolar transistor which is used as switching elements (active elements) T1, T2, T3. FIG. 1(C) is a simplified band view served for explaining the operation of the NPN-type bipolar transistor. FIG. 1D is an explanatory view of a PNP-type bipolar transistor.

The dimming circuit shown in FIG. 7 corresponds to a CFL-current stabilizing circuit shown in FIG. 1(A). A CFL-current detection feedback circuit and a pulse shaping circuit not shown in FIG. 7 are added as features of the light source driving circuit DRV of this embodiment. As described above, the discharge condition (light emitting luminance due to discharge condition) in the discharge tube LP is controlled in response to the adjustment of electric current and voltage in the dimming circuit. The dimming circuit which performs the luminance control of the discharge tube LP by intermittently generating the direct current and the direct voltage (in rectangular shapes, for example) at the primary side circuit of the light source driving circuit DRV is also referred to as a DC-to-DC converter. The "DC" denotes "direct-current", and the DC-to-DC converter converts a direct voltage of a direct current. In turning on the discharge tube LP by burst driving described later, the lamp current $I_L$ which is assumed to be generated in the secondary side circuit is made to conform to a desired turn-ON-state luminance based on the intermitting interval (duty ratio) so that the stabilization is achieved.

To the contrary, a circuit shown in a frame indicated by a broken line in FIG. 1(A)(described later in FIG. 2(A) in an enlarged form) periodically reverses a potential between one end (I) and another end (II) of the primary side coil of the transformer TRFM and generates an alternating electric field between electrodes in the discharge tube LP. To observe the secondary side circuit of the light source driving circuit DRV according to this embodiment, the secondary side circuit performs processing such that by chopping the previously-mentioned direct voltage, the polarity of a voltage pulse generated at one end of the discharge tube LP is periodically reversed in a circuit disposed in the frame indicated by a broken line. However, the period that the polarity is reversed is shorter than the period that the voltage pulse is intermittently generated. A CFL-current detection feedback circuit feedbacks the operation state of the secondary side circuit to the CFL-current stability circuit by the burst operation of the discharge tube LP described later, wherein the CFL-current stability circuit can modulate the voltage and the current without damaging the stability of the operation of the secondary side circuit. Further, the pulse shaping circuit (including matching resistances $R_{M1}$, $R_{M2}$ thereof) is provided particularly for this embodiment and a function thereof is explained later.

Figure 2A:
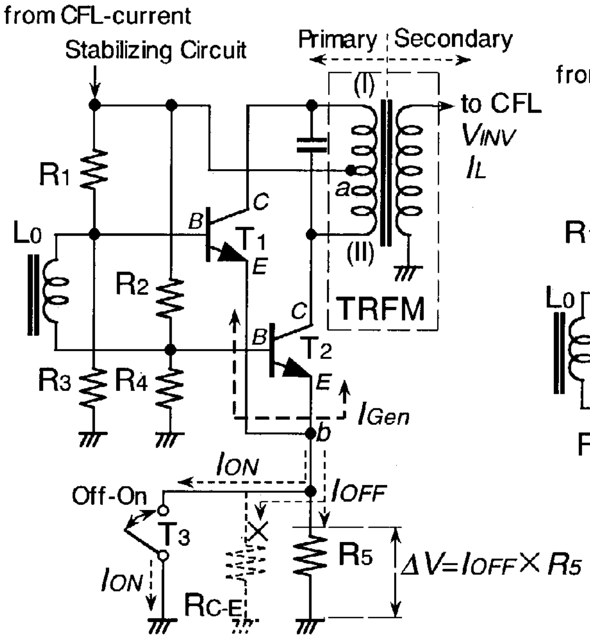
Figure 2B:
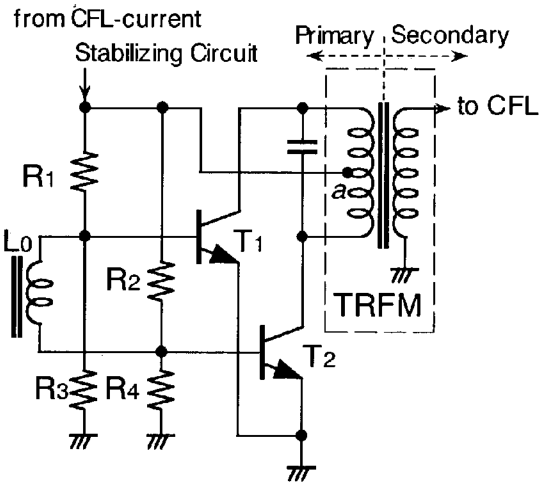
Fig. 2(B) Prior Art

The light source driving circuit DRV of this embodiment shown in FIG. 1(A) is further explained in conjunction with FIG. 2(A) which shows a major portion of the light source driving circuit DRV in an enlarged form and FIG. 2(B) which shows a portion of a conventional light source driving circuit corresponding to the major portion in an enlarged form.

The circuits shown in FIG. 2(A) and FIG. 2(B) generate, in the light source driving circuit of this embodiment and the conventional light source driving circuit, the alternating electric field which modulates one potential of a pair of electrodes formed in the discharge tube with respect to another potential. For example, when a voltage signal $V_0$ is inputted from the lamp current stabilizing circuit shown in FIG. 1 to this circuit, for example, an alternating voltage having a voltage range: 2 $V_0$ appears between an end portion (I) and an end portion (II) of the primary side coil of the transformer circuit TRFM. In response to the voltage signal $V_0$ inputted to this circuit, a current is generated alternately between the switching elements T1 and T2 (between a collector C and an emitter E of the bipolar transistor in this embodiment) due to a resistance R1 and an inductance $L_0$ provided to the circuit. In the light source driving circuit DRV provided with the leakage flux type transformer circuit TRFM shown in FIG. 1(A), the inductance $L_0$ is arranged at the primary side thereof as a third coil together with the primary side coil. Accordingly, the inductance $L_0$ is often referred to as the third coil and is also expressed as the third coil in this specification.

In this manner, in response to the alternating voltage generated at the primary side circuit, by the primary side coil of the transformer circuit TRFM, an operation to raise the potential of the end portion (I) higher than the potential of the end portion (II) at the time of generating a base current at the switching element T2 and an operation to raise the potential of the end portion (II) higher than the potential of the end portion (I) at the time of generating a base current at the switching element T1 are repeated so as to induce the alternating voltage at the secondary side circuit.

In other words, as the switching elements T1 and T2 are alternately turned on, the polarity between both end portions (I), (II) of the primary side coil is reversed. Accordingly, the circuits shown in FIG. 2(A) and FIG. 2(B) are also referred to as inverter circuits, while voltages $V_{INV}$ which are outputted from the secondary sides are referred to as inverter output voltages in this embodiment. Further, in this embodiment which uses the NPN-type bipolar transistor as the switching elements T1, T2, the polarities of collector regions C of both switching elements T1, T2 are reversed and hence, the inverter circuits of this type are also referred to as “collector resonance type”.

In the conventional inverter output circuit shown in FIG. 2(B), one ends (emitters or E side) of the switching elements T1 and T2 which generate the alternating voltage at the secondary side are set to a ground potential (also including the reference potential in the liquid crystal display device or the like for convenience sake in this specification). Although the voltage signal $V_0$ is applied to another ends (collector, C side) of the switching elements T1 and T2 by way of the above-mentioned primary side coil, since the current is generated only on either one of the switching elements T1 and T2, the potential of another end of one switching element is turned to the ground potential. Accordingly, the potential difference between the respective another ends of the switching elements T1, T2 generate the potential difference between the end portions (I) and (II) of the primary side coil.

On the other hand, in the inverter output circuit of this embodiment shown in FIG. 2(A), a resistance element (an example of the passive element) R5 and the switching element T3 are connected in parallel between one ends (emitter E side) of the switching elements T1 and T2 which generate the alternating voltage at the secondary side and the above-mentioned ground potential. The resistance element R5 has resistance higher than resistance of a current path when the switching element T3 assumes the turn-ON state (state in which the current flows in the switching element T3). Here, in this embodiment, all of the switching elements T1, T2 and T3 use the bipolar transistor and hence, the resistance of each current path is referred to as collector-emitter resistance (or C-E resistance). When the switching elements use a field effect transistor, the resistance of each current path is referred to as a channel resistance.

Figure 3A:
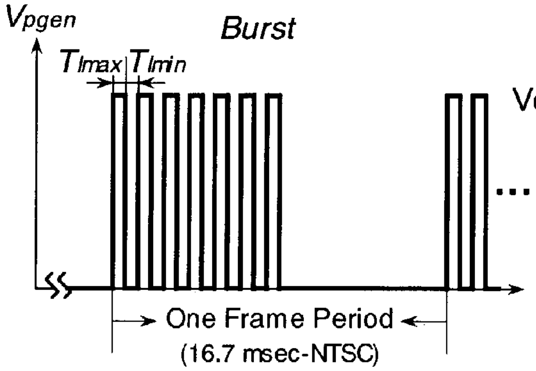
Figure 3B:
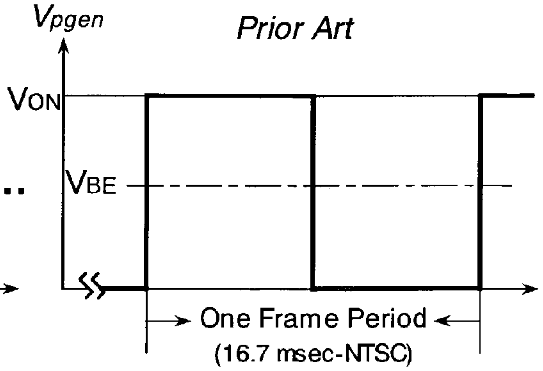
Fig. 3(B) Prior Art

Before explaining the burst driving of the light source driving circuit (see FIG. 1(A)) of this embodiment provided with the inverter circuit shown in FIG. 2(A), the outline of burst driving is explained in conjunction with FIG. 3(A) and FIG. 3(B). To enhance a contrast ratio of display images in the liquid crystal display device or to clarify a profile of a motion picture displayed by the liquid crystal display device, Japanese Unexamined Patent Publication 2002-123226 and Japanese Unexamined Patent Publication 2001-108962 discuss the technique in which the radiation of light to the liquid crystal display panel is intermittently performed by the light source device or this operation is performed in synchronism with the frame period of the display images. A voltage waveform of a control signal at the primary side of the inverter circuit corresponding to turning on or lighting of the light source (lamp) discussed in these publications exhibits either one of voltage values of $V_{ON}$ (lighting voltage of the light source) and 0 (or $V_{OFF}$: extinguishing voltage of the light source) at a given interval as shown in FIG. 3(B). In FIG. 3(B), in the operation of the liquid crystal display device which performs the image display for every one frame period at the frequency of 60 Hz using an NTSC method, one lamp lighting period and one lamp extinguishing period are included within time: 16.7 msec (msec=$10^{-3}$ seconds) in which an image of one frame period is formed on a screen of the liquid crystal display device). Further, lowering of luminance of the liquid crystal display panel in the extinguishing period can be reduced by controlling the voltage value: $V_{ON}$ of the control signal at the primary side of the inverter circuit in the lighting period.

To the contrary, with respect to the light source device to which the burst driving method is applied, as in the case of the first half of one frame period (corresponding to the above-mentioned lighting period in FIG. 3(B)) shown in FIG. 3(A), the primary side current of the inverter circuit is divided into a plurality of voltage pulses. A ratio between a period of these voltage pulses (hereinafter referred to as a burst ON period: $T_{Imax}$) and a period separating these voltage pulses (hereinafter referred to as a burst OFF period: $T_{Imin}$) (hereinafter referred to as “a duty ratio” in burst driving) is adjusted by a burst signal inputted to the light source driving circuit DRV.

An inverse number of an interval ranging from a first point of time at which the burst ON period $T_{Imax}$ is started to a second point of time at which the succeeding burst ON period $T_{Imax}$ is started (period: $T_{Imax}+T_{Imin}$) is referred to as frequency for burst driving and is set by the light source driving circuit DRV in response to the burst signal in the same manner as the above-mentioned duty ratio. The frequency of burst driving is higher than the frame frequency of the image display in the liquid crystal display panel (inverse number of the above-mentioned one frame period) and is lower than the frequency of the lamp current converted into an alternating current by the inverter circuit (indicated by $I_L$ in FIG. 1(A) (hereinafter referred to as “inverter frequency”). The inverter frequency assumes any value within a range of 25 kHz to 150 kHz corresponding to a usage and specification of the liquid crystal display device. The inverter frequency is set to a value within a range of 40 kHz to 50 kHz in many cases with respect to the liquid crystal display device for a monitor or a television receiver. The inverter frequency periodically reverses the direction of electric field generated by the discharge tube LP so as to prevent local degradation of wall surfaces and electrodes inside the discharge tube LP. On the other hand, the frequency of the burst driving is adjusted to a value within a range of several hundreds Hz to several kHz. For example, the frequency of the burst driving is adjusted to 300 Hz (3.3 msec as the above-mentioned $T_{Imax}+T_{Imin}$), for example.

In the burst driving method, along with the above-mentioned duty ratio of voltage pulse and frequency, the voltage amplitude and the current amplitude of the primary side circuit in the burst ON period $T_{Imax}$ can be also adjusted. Due to such adjustment, lowering of luminance of the light source device which is generated during the lamp extinguishing period (the latter half of one frame period in FIG. 3(A)) can be suppressed.

In case of the light source driving circuit DRV which is provided with the inverter output circuit shown in FIG. 2(B) within a frame indicated by a broken line in FIG. 1(A), the burst signal is inputted to the CFL stabilizing circuit (dimming circuit) and determines the voltage value $V_0$ and the duty ratio of the voltage pulse inputted to the inverter circuit. Further, a current supplied from the CFL stabilizing circuit to the inverter circuit enters the primary side coil of the transformer circuit TRF from an intermediate point (point a) of the primary side coil and, at the same time, enters respective basis of transistors T1, T2 which constitute differential circuits in the inverter circuit via the resistances R1, R2 and the third coil $L_0$. Accordingly, the transistors (switching elements) T1 and T2 are alternately turned on as mentioned above and hence, the polarity between both end portions (I), (II) of the primary side coil is periodically reversed. The period of this polarity inversion becomes the above-mentioned inverter frequency. Here, the resistances R3, R4 serve for setting respective base potentials of the transistors T1, T2 to given values.

In the light source driving circuit DRV using the inverter output circuit shown in FIG. 2(B), both of the above-mentioned transistors (switching elements) T1, T2 are turned off during the above-mentioned burst OFF period $T_{Imin}$ and hence, the potential difference between one end (I) and another end (II) of the primary side coil of the transformer circuit TRFM disappears. Corresponding to this disappearing of the potential difference, the current of the primary side coil is also stopped. Respective waveforms of the voltage (lamp voltage: $V_L$) and the current (lamp current: $I_L$) which are generated at the secondary side circuit of the light source driving circuit DRV in the vicinity of a point of time $t_{start}$ at which the period is changed over from the burst OFF period $T_{Imin}$ to the burst ON period $T_{Imax}$ are shown in FIG. 4(B).

Figures 4A, 4B:
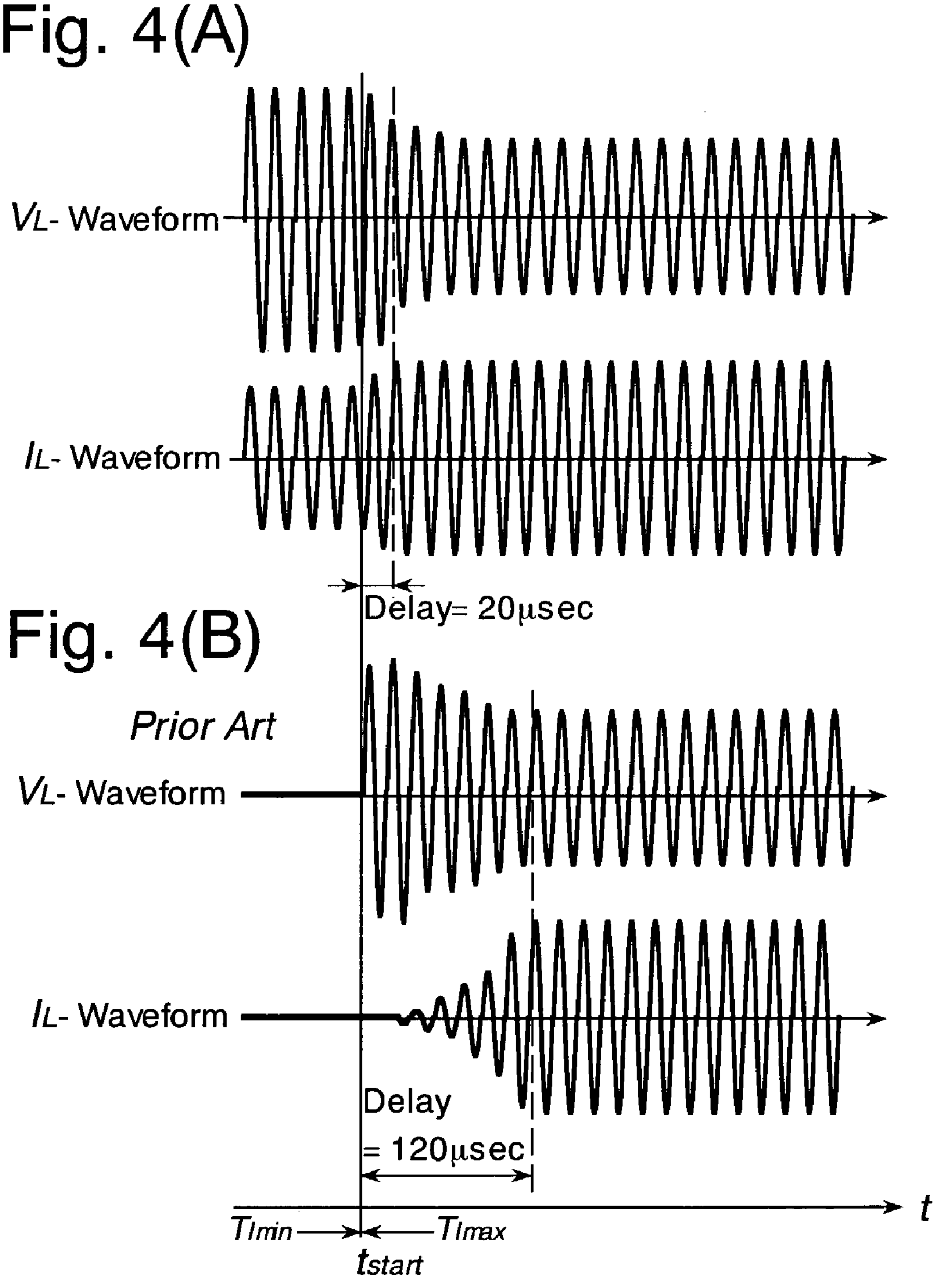

Before the point of time $t_{start}$ (burst OFF period) in FIG. 4(B), both of the voltage $V_L$ and the current $I_L$ are substantially retained at a Zero-Level. On the other hand, after a lapse of about 120 μsec (μsec=$10^{-6}$ seconds) from the start time $t_{start}$ of the burst ON period, both waveforms of the voltage $V_L$ and the current $I_L$ are settled to stationary amplitudes. The reversal of polarity with short period which occurs on the $V_L$ waveform and the $I_L$ waveform during the burst ON period shown in FIG. 4(B) corresponds to the frequency of the lamp voltage and the lamp current for preventing local degradation of the inside of the above-mentioned discharge tube LP. This period is 6.6 to 40 μsec and hence is extremely short compared to the above-mentioned ($T_{IMax}+T_{Imin}$). Here, when the inverter output circuit shown in FIG. 2(B) is used, the above-mentioned inverter frequency (frequency of polarity inversion of the lamp voltage $V_L$ and the lamp current $I_L$) is determined by an interval at which the above-mentioned transistors T1, T2 are alternately turned on.

As can be clearly understood from the $V_L$ waveform shown in FIG. 4(B), within the burst driving period of the discharge tube LP, the voltage waveform which is considered to be substantially non-present in the burst OFF period is abnormally largely oscillated over approximately 120 μsec for every starting of the burst ON period and, thereafter, is settled to the stationary state. To express this potential difference as Zero-to-Peak($V_{0\text{-}p}$), the potential difference assumes 1.9 $kV_{0\text{-}p}$ at maximum with respect to the stationary state in which the potential difference assumes 1.3 $kV_{0\text{-}p}$. On the other hand, the $I_L$ waveform which is substantially at the Zero-Level during the burst OFF period gradually expands the amplitude during the above-mentioned about 120 μsec and is settled to a given current value around a point of time that the $V_L$ waveform assumes the stationary state. To express this current value as Zero-to-Peak ($I_{0\text{-}p}$), the current value assumes 16.5 $mA_{0\text{-}p}$, while when the current value is expressed as the effective value ($I_{eff}$), the current value becomes 8.8 $mA_{rms}$. Here, rms which is affixed to the unit of the effective current value implies that the effective current value is calculated as the root mean square value. This effective current value: $I_{rms}$ can be approximately calculated based on the maximum current value: $I_{max}$ substantially using a following formula.

$$I_{rms}=I_{max}/2^{1/2}\approx I_{max}/1.414 \quad \text{(formula)}$$

In the light source driving circuit DRV using the inverter output circuit shown in FIG. 2(B), as mentioned above, turning ON and OFF of the current and the voltage of the primary side circuit is repeated in response to the frequency of the burst driving. Accordingly, from a viewpoint that the luminance of the radiation light from the discharge tube LP depends on the lamp current $I_L$, the accumulation of time of about 120 μsec which is required for the amplitude of the lamp current $I_L$ to obtain the stationary value for every starting of the burst ON period weakens the intensity of light radiation to the liquid crystal display panel PNL from the light source device LUM over the burst driving period. Further, the temporary increase of voltage amplitude of the lamp voltage $V_L$ which is generated every starting of the burst ON period increases an energy change quantity per unit time in the light source driving circuit DRV and generates noises in the light source driving circuit DRV.

To the contrary, in this embodiment, as shown in FIG. 1(A), the inverter circuit in the inside of the frame indicated by the broken line is changed to a circuit similar to the inverter circuit shown in FIG. 2(A). One of features of this embodiment lies in that with respect to a pair of electrodes (forming an exit and an entrance of the current to be switched) which are respectively provided to the switching elements T1 and T2, one electrode which is not connected to the primary side coil of the transformer circuit TREM is not directly connected to the ground potential or the reference potential as shown in FIG. 2(B), and a circuit which arranges new switching element T3 and resistance element R5 in parallel is inserted between the pair of electrodes. Accordingly, the potential of a point b which is connected to one electrode out of the switching elements T1 and T2 shown in FIG. 1(A) depends on the resistance of the current path of the switching element T3 in the turn-ON state and on the resistance of resistance element R5 and is elevated with respect to the ground potential or the reference potential.

Another feature of this embodiment lies in that the above-mentioned burst signal (also including a signal corresponding to this burst signal) is inputted not only to the CFL current stabilizing circuit (dimming circuit) but also to the control electrode of the switching element T3 (base electrode when the switching element is the bipolar transistor and the gate electrode when the switching element is the field effect transistor). The control of the switching element T3 in response to the burst signal is performed such that the burst signal is made to pass a pulse shaping circuit (like a pulse regulation circuit) so as to turn on the switching element T3 during the burst ON period $T_{Imax}$ and to turn off the switching element T3 during the burst OFF period $T_{Imin}$.

The value of the resistance R5 which is connected in parallel to the point b in FIG. 1(A) together with the switching element T3 is set higher than the resistance of the current path when the switching element T3 assumes the turn-ON state and is preferably set lower than the resistance of the current path when the switching element T3 assumes the turn-OFF state. The resistance R5 is set such that the voltage elevation at the point b which is generated by the inflow of the current $I_{OFF}$ when the switching element T3 assumes the turn-OFF state is set larger than the voltage $V_0$ (with respect to the ground potential or the reference potential) of the current which enters the inverter circuit from the CFL current stabilizing circuit. In this embodiment which uses the NPN-type bipolar transistor as the switching element T3, the resistance of the current path is defined as the resistance value of a semiconductor layer starting from the collector region C and reaching the emitter region E through the base region B (expressed by the resistance between the collector and the emitter or the C-E resistance). When the field effect transistor is used as the switching element T3, the resistance value of a channel layer thereof (a semiconductor layer which increases or decreases the carrier density in response to an electric field applied from the gate electrode) corresponds to the resistance of the current path of the switching element T3.

Figures 5A, 5B, 5C, 5D, 5E:
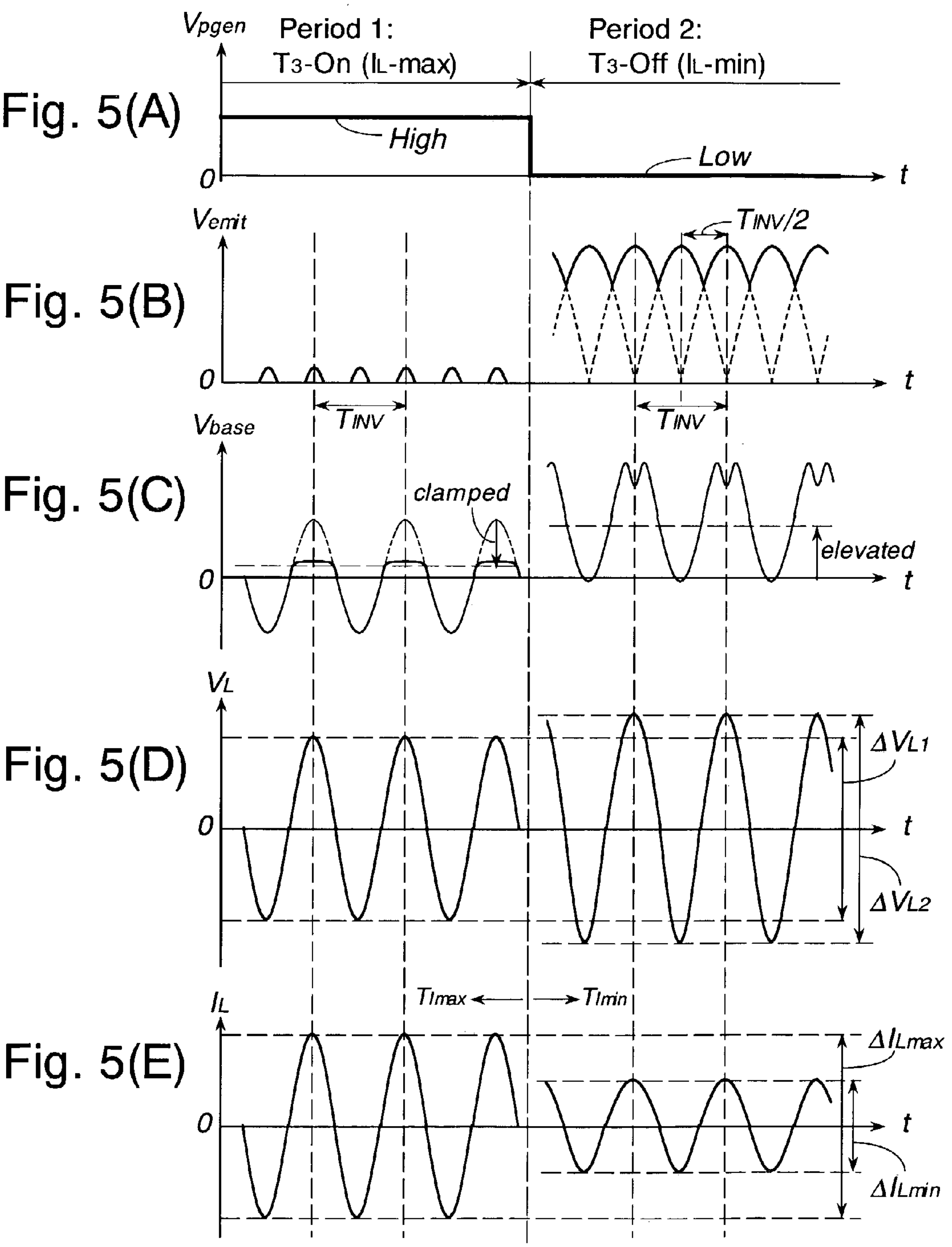

The manner of operation of the light source driving circuit DRV shown in FIG. 1(A) is explained using not only the bipolar transistor of the switching element T3 but also the inverter circuit generally shown in FIG. 2(A), and further in conjunction with respective waveforms shown in FIG. 5(A) to FIG. 5(E). Here, FIG. 5(A) shows the voltage waveform $V_{pgen}$ which is outputted to the switching element T3 from the pulse shaping circuit. FIG. 5(B) shows emitter voltages $V_{EMIT}$ of the switching elements (bipolar transistors) T1 and T2 shown in FIG. 2(A), that is, the voltage Vb at the point b in FIG. 2(A). FIG. 5(C) indicates the base voltage $V_{BASE}$ of one of the switching elements T1 or T2 shown in FIG. 2(A). $T_{INV}$ shown in FIG. 5(B) indicates the inverse number of the inverter frequency. And when FIG. 5(C) indicates the base voltage waveform of the switching element T1, the base voltage waveform of the switching element T2 is shifted with respect to the switching element T1 along the time axis by ($T_{INV}/2$). FIG. 5(D) and FIG. 5(E) respectively indicate the waveforms of the potential difference (the above-mentioned lamp voltage) $V_L$ and the current (the above-mentioned lamp current) $I_L$ which are generated between the electrodes of the discharge tube LP (see FIG. 1(A)) due to the alternating-current power outputted from the secondary side of the transformer TRFM shown in FIG. 2(A). The waveforms shown in FIG. 5(A) to FIG. 5(E) are depicted with respect to a common axis of abscissas (time axis) except for the point of time that the waveform $V_{pgen}$ shown in FIG. 5(A) is changed from the High state to the Low state.

During the burst ON period $T_{Imax}$ in which the switching element T3 is turned on, in response to the current $I_{ON}$ which is inputted to the inverter circuit at the voltage $V_0$ with respect to the ground potential or the reference potential from the CFL current stabilizing circuit, the switching elements T1, T2 are alternately turned on and the current $I_{ON}$ always reaches the above-mentioned point b from either one of the switching elements T1, T2. As mentioned previously, the current path when the switching element T3 assumes the turn-ON state exhibits the resistance value lower than the resistance R5 which is arranged in parallel with the current path and hence, most of the current $I_{ON}$ which reaches the point b reaches the ground potential or the reference potential through the current path of the switching element T3.

In FIG. 5(A), the burst ON period $T_{Imax}$ corresponds to a period 1 in which the voltage waveform $V_{pgen}$ assumes the High state. Also in FIG. 5(B) to FIG. 5(E), the waveforms which are indicated in respective left halves correspond to the period 1. As mentioned previously, since the resistance value of the current path when the switching element T3 assumes the turn-ON state can be substantially ignored compared to the resistance R5, even when the current $I_{ON}$ passes the current path, substantially no potential difference is generated between both ends of the switching element T3. Accordingly, as shown in the left half of FIG. 5(B), the potential Vb ($V_{EMIT}$) at the point b is considered to be held substantially at the ground potential (or the reference potential) although the minute elevation of the potential Vb is intermittently generated. On the other hand, although the respective base voltages $V_{BASE}$ of the switching elements T1 and T2 exhibit the phase difference of $T_{INV}/2$ as described above, these base voltages $V_{BASE}$ exhibit the waveforms as shown in the left half of FIG. 5(C).

Although the polarities of respective base voltages $V_{BASE}$ of the switching elements T1 and T2 are reversed in response to the inverter frequency ($T_{INV}^{-1}$), when the voltage value reaches a certain level having positive polarity, the voltage value is clamped to a given positive voltage value or a value in the vicinity of the positive voltage value due to the base current which flows into the emitter region E from the base region B. To take into consideration that the switching elements T1, T2 of this embodiment are constituted of the NPN-type bipolar transistor (see FIG. 1(B)), a large number of electrons flow into the base region B from the emitter region E as shown in FIG. 1(C) when the switching elements T1, T2 assume the turn-ON state and hence, the potential is lowered relatively whereby clamping of the base voltage $V_{BASE}$ to the specific positive voltage value can be easily appreciated. A curve indicated by a broken line at the positive polarity side arranged at the left half of FIG. 5(C) indicates an imaginary change of the base voltage $V_{BASE}$ when there is no clamping of voltage attributed to the base current. These voltage clamping periods of base voltage $V_{BASE}$ indicate periods in which the switching elements T1 and T2 are respectively turned on, and respective turn-ON periods are repeated while maintaining the phase difference of time $T_{INV}/2$ from each other at an interval of time $T_{INV}$. Accordingly, the potential difference between one end (I) and another end (II) of the primary side coil of the transformer circuit TRFM is reversed at a cycle of time $T_{INV}/2$, whereby the lamp voltage $V_L$ and the lamp current $I_L$ having the waveforms indicated in the left halves of FIG. 5(D) and FIG. 5(E) are observed.

In the operation of the light source driving circuit DRV during the burst ON period $T_{Imax}$ which has been explained in conjunction with the left halves of FIG. 5(A) to FIG. 5(E), the resistance of the switching element T3 is inserted between the point b (see FIG. 1(A) and FIG. 2(A)) and the ground potential (or the reference potential). However, the operation is considered substantially as same as the operation of the light source driving circuit DRV using the inverter circuit shown in FIG. 2(B).

However, with respect to the operation of the light source driving circuit DRV during the burst OFF period $T_{Imin}$ which is explained hereinafter, the operation peculiar to the liquid crystal display device of the present invention is observed.

During the burst OFF period $T_{Imin}$ in which the switching element T3 is turned off, applying of the voltage $V_0$ to the point a of the inverter circuit (intermediate point of the primary side coil of the transformer TRFM, see FIG. 1(A) and FIG. 2(A)) from the CFL current stabilizing circuit is stopped. Further, the change of voltage which alternately turns on the switching elements T1, T2 in the burst ON period $T_{max}$ (see the above-mentioned base voltage and FIG. 5(C) in this embodiment) is also stopped in the burst OFF period $T_{Imin}$ and the control signals of the switching elements T1, T2 (the above-mentioned base currents in this embodiment) are fixed to approximately constant voltage values. When the bipolar transistor is used as the switching elements T1, T2 as in the case of this embodiment, although the base potential exhibits the minute fluctuation during the burst OFF period $T_{Imin}$, the base potential is held at a value close to the collector potential. Even when the field effect transistor is used in place of the bipolar transistor as the switching elements T1, T2, the gate potential is held at a value close to the source potential (or the drain potential) during the burst OFF period $T_{Imin}$. Accordingly, irrespective of the kind (the bipolar transistor, the field effect transistor or the like) of the switching elements T1, T2, a quantity of current which passes respective switching elements T1, T2 (a value of current which flows from the collector region C into the emitter region E with respect to the NPN-type bipolar transistor) is reduced. The current which flows in the point b from the switching elements T1, T2 respectively during the burst OFF period $T_{Imin}$ in the above-mentioned manner is referred to as $I_{OFF}$.

In the inverter circuit of this embodiment, the switching element T3 provided between the point b and the ground potential (or the reference potential) is turned off during the burst OFF period $T_{Imin}$. Accordingly, a circuit which arranges the resistance R5 and the resistance $R_{C-E}$ of the current path of the switching element T3 in the OFF state is formed between the point b and the ground potential (or the reference potential). The switching element T3 exhibits the extremely high resistance value at the turn-OFF time to control the conductivity of the current path by changing the concentration of carriers (electrons and holes) of the current path formed on the semiconductor layer. Accordingly, during the burst OFF period $T_{Imin}$, the above-mentioned current $I_{OFF}$ substantially passes only the resistance R5 and the potential difference: ΔV (unit: V)=$I_{OFF}$ (unit: A)×R5 (unit: Ω) is generated between the point b and the ground potential (or the reference potential). As a result, as will be explained hereinafter in conjunction with FIG. 5(A) to FIG. 5(E), the luminance of the discharge tube LP is adjusted without extinguishing the luminance of the discharge tube LP.

In FIG. 5(A), the right-side period 2 in which the voltage waveform $V_{pgen}$ outputted to the switching element T3 from the pulse shaping circuit (see FIG. 1(A)) assumes the Low state corresponds to the burst off period $T_{Imin}$. Also in FIG. 5(B) to FIG. 5(E), the waveforms shown in respective right halves correspond to the period 2. As described previously, when the current $I_{OFF}$ passes the resistance R5, the voltage of the point b(the point b side of the resistance R5 in a strict sense) is elevated. In the burst off period $T_{Imin}$, the voltage is not applied to the inverter circuit due to the CFL current stabilizing circuit and hence, the potential of the point b is elevated not only with respect to the ground potential (or the reference potential) but also with respect to the whole region of the inverter circuit. As a result, as shown in the right half of FIG. 5(B), although the potential Vb($V_{EMIT}$) of the point b fluctuates at a cycle of($T_{INV}$/2), the potential Vb($V_{EMIT}$) assumes a higher value compared to a value during the burst ON period $T_{Imax}$. Along with such elevation of potential at the point b, the current $I_{Gen}$ which flows toward the switching elements T1, T2 from this point b is generated so that an alternating electric field is generated between one end(I) and another end(II) of the primary side coil of the transformer circuit TRFM via the third coil $L_0$ as shown in FIG. 2(A).

As shown in FIG. 2(A), to the inverter circuit (the primary side circuit) of this embodiment, the power source for generating the above-mentioned current $I_{Gen}$ is not provided. Further, the inverter circuit is not electrically connected to such a power source. That is, by only providing the passive element (resistance R5) between the primary side and the ground potential (or reference potential) of the inverter circuit and by only making the current $I_{OFF}$ generated by the inverter circuit (primary side) in the turn-OFF state flow into the passive element, the potential of the point b is elevated and the current $I_{Gen}$ is generated. Further, opposite to the current $I_{ON}$ which is generated during the burst ON period, the above-mentioned current $I_{Gen}$ flows into the switching elements T1 and T2 from the point b and further, the voltage is alternately applied to the base regions B of the switching elements T1 and T2 through the primary side coil of the transformer circuit TRFM. Accordingly, the pair of switching elements T1, T2(constituting a differential circuit) and the resistance R5 which are included in the inverter circuit of this embodiment shown in FIG. 2(A) function as a self-excited type alternating-current power generator (alternator) which feedbacks the current $I_{OFF}$ generated at the primary side during the burst OFF period $T_{Imin}$ to the primary side and outputs the alternating voltage from the secondary side.

In the burst Off period $T_{Imin}$, the respective base voltages $V_{BASE}$ of the switching elements T1 and T2 exhibit the voltage amplitude in response to the operation as the self-excited type circuit at the primary side of the inverter circuit, wherein the center of the voltage amplitude is lifted to the positive potential from 0V as indicated by the waveform at the right half of FIG. 5(C). Due to such an operation of the primary side circuit in the burst Off period $T_{Imin}$, the alternating-current power is outputted from the secondary side of the transformer circuit TRFM and hence, the alternating voltage (lamp voltage) $V_L$ having the waveform shown in the right half of FIG. 5(D) is generated between the electrodes of the discharge tube LP. The waveform of the lamp voltage $V_L$ generated during the burst Off period $T_{Imin}$ has the voltage amplitude greater than the voltage amplitude during the burst ON period $T_{Imax}$ shown in the left half of FIG. 5(D).

Here, to make use of the discharge tube LP as the light source, it is necessary to generate the self-sustaining discharge in the inside thereof. This self-sustaining discharge is started when the current generated in the discharge tube LP(also referred to as the above-mentioned lamp current $I_L$, the discharge current) exceeds a given value(substantially $10^{-8}$ to $10^{-7}$ A )and this self-sustaining discharge is classified to either one of a subnormal glow discharge and a normal glow discharge along with the increase of the current value. On the other hand, the validity of the self-sustaining discharge is determined by the combination of lamp voltage $V_L$ and the value of lamp current $I_L$, wherein corresponding to the elevation of the lamp current $I_L$, the lamp voltage $V_L$ suitable for the self-sustaining discharge is lowered. The subnormal glow discharge and the normal glow discharge are separated using the lamp current $I_L$ value of several mA (milliampere) (the current value being changed corresponding to the discharge tube or discharge conditions), wherein the differential coefficient of the lamp voltage $V_L$ with respect to the lamp current $I_L$ suitable for subnormal glow discharge is larger than the differential coefficient suitable for normal glow discharge.

Figure 6:
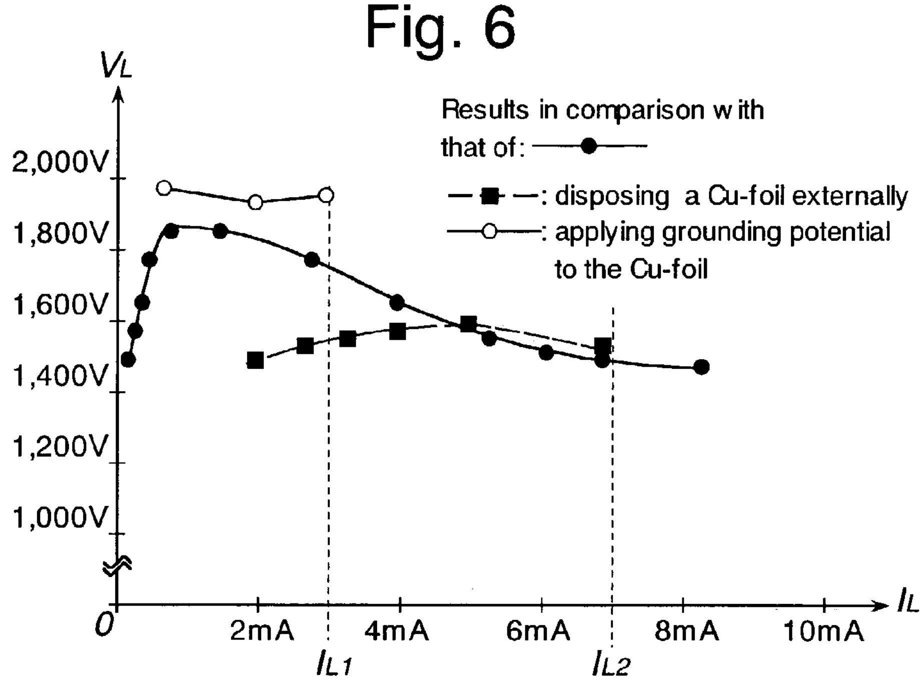
FIG. 6 is a graph showing the relationship between the preferable lamp current $I_L$ and the lamp voltage $V_L$ for generating a self-sustaining discharge in the discharge tube.

The relationship between the lamp current $I_L$ and the lamp voltage $V_L$ suitable for the self-sustaining discharge is indicated by a solid line graph plotted by black dots in FIG. 6. To ignore four black dotted plots at the left end from a viewpoint of the validity of the above-mentioned self-sustaining discharge, the solid line graph is descended toward the right side and a gradient is increased toward the left side (the lamp current $I_{L1}$ side). Accordingly, as shown in FIG. 5(D), by making the amplitude of the lamp voltage $V_L$ in the burst Off period(2) larger than the amplitude of the lamp voltage $V_L$ in the burst ON period(period 1), the amplitude of the lamp current $I_L$ in the burst Off period(period 2)can be made smaller than the amplitude of the lamp current $I_L$ in the burst ON period(period 1)shown in FIG. 5(E) so as to lower the luminance of the discharge tube LP. For example, when the normal glow discharge is generated in the inside of the discharge tube LP during the burst ON period using the lamp current $I_{L2}$(see FIG. 6) and, at the same time, when the subnormal glow discharge is generated in the inside of the discharge tube LP during the burst OFF period using the lamp current $I_{L1}$(see FIG. 6), the lamp current $I_L$ is largely changed striding over both periods whereby a modulation ratio of light emitting luminance of the discharge tube LP is enhanced. In the liquid crystal display device which includes the discharge tube LP which is driven in such a manner in the light source device LUM, the contrast of the display image is enhanced corresponding to the luminance modulation ratio of light irradiated to the liquid crystal display panel from the light source device LUM. Further, the discharge in the inside of the discharge tube LP continues even during the burst OFF period and hence, lowering of luminance of the whole display image can be suppressed.

The above-mentioned solid-line graph indicated with black dotted plots in FIG. 6 shows the relationship between the lamp current $I_L$ and lamp voltage $V_L$ suitable for the self-sustaining discharge as mentioned above. Here, particularly in the right half(normal glow discharge region), the change of lamp voltage $V_{L1}$ with respect to the change of the lamp current $I_L$ is small. In other words, to continue the discharge in a stable manner with respect to the minute change of the lamp voltage $V_L$, it is necessary to change the lamp current $I_L$ largely. In the inverter circuit shown in FIG. 2(B), inputting of the voltage signal to the primary side circuit is stopped at the beginning of the burst OFF period and, at the same time, the current is swept from the switching elements T1, T2 to the ground potential (or the reference potential) and hence, the potential difference of the primary side coil of the transformer circuit TRFM rapidly disappears. Accordingly, in the secondary side circuit of the light source driving circuit DRV, the lamp current $I_L$ cannot follow the change of the lamp voltage $V_L$ so that the discharge inside of the discharge tube LP cannot but stop.

To the contrary, in the inverter circuit of this embodiment shown in FIG. 2(A), even when inputting of the voltage signal to the primary side circuit is stopped, due to the resistance added between the switching elements T1, T2 and the ground potential (or the reference potential), the self-excited circuit is formed in the inside of the primary side circuit and hence, the primary side current imparts the potential difference to the primary side coil of the transformer circuit TRFM. Accordingly, the change of the lamp voltage $V_L$ which is generated in the secondary side of the light source driving circuit DRV over a period from the burst ON period to the burst Off period is limited to a range which allows the lamp current $I_L$ to follow the change of the lamp voltage $V_L$. As a result, the luminance of the discharge tube LP can be changed without stopping the discharge in the inside of the discharge tube LP.

By driving the light source device of this embodiment which maintains the discharge inside the discharge tube LP through the burst periods(including both of the ON period and the OFF period), the lamp voltage $V_L$ and the lamp current $I_L$ having the waveforms shown in FIG. 4(A) are generated at the secondary side of the light source driving circuit DRV. In the stationary state during the burst ON period $T_{Imax}$ indicated at the right side of FIG. 4(A), the lamp voltage $V_{L1}$ exhibits the Zero-to-Peak value amounting to 1.1 $kV_{0\text{-}P}$ and the lamp current $I_L$ exhibits the Zero-to-Peak value amounting to 16.5 $mA_{0\text{-}P}$. Further, in the stationary state during the burst OFF period $T_{Imin}$ indicated at the left side of FIG. 4(A), the lamp voltage $V_L$ exhibits the Zero-to-Peak value amounting to 1.3 $kV_{0\text{-}P}$ and the lamp current $I_L$ exhibits the Zero-to-Peak value amounting to 8.0 $mA_{0\text{-}P}$. As can be clearly understood from the comparison between FIG. 4(A) and FIG. 4(B), in this embodiment shown in FIG. 4(A), even during the burst Off period $T_{Imin}$, the lamp voltage $V_L$ and the lamp current $I_L$ assume the stationary states in which the respective amplitudes are settled to the given values (excluding zero: 0). Further, in this embodiment, after a lapse of 20 μsec from the starting time: $t_{start}$ of the burst ON period $T_{Imax}$, both of the lamp voltage $V_L$ and the lamp current $I_L$ exhibit the amplitudes in the stationary state. Further, the abnormal elevation of the amplitude of the lamp voltage $V_{L1}$ observed within 120 μsec after the time: $t_{start}$ in FIG. 4(B) is not recognized in FIG. 4(A).

On the other hand, the inverter circuit of this embodiment shown in FIG. 2(A) and the inverter circuit shown in FIG. 2(B) are respectively incorporated into the respective light source driving circuit DRV of the respective liquid crystal display devices. In the former case, the burst signal is inputted to the CFL current stabilizing circuit and the pulse shaping circuit, while in the latter case, the burst signal is inputted only to the CFL current stabilizing circuit. Then, the luminance of light radiated to the respective liquid crystal display panels is modulated in response to the burst signal. As a result, both liquid crystal display devices are of equal level with respect to the contrast of the display image. However, with respect to the luminance of the whole screen, the liquid crystal display device of this embodiment provided with the inverter circuit shown in FIG. 2(A) exhibits the higher luminance than the liquid crystal display device provided with the inverter circuit shown in FIG. 2(B). In other words, with the provision of the liquid crystal display device of this embodiment, it is possible to provide the bright display of an image with the high contrast ratio. Further, the level of noises generated from the light source driving circuit DRV during the burst driving period can be considerably reduced by the liquid crystal display device of this embodiment.

To collate:

(i) the light source driving circuit DRV provided with the inverter circuit of this embodiment shown in FIG. 2(A) exhibits the voltage waveform and the current waveform shown in FIG. 4(A); and (ii) the light source driving circuit DRV provided with the inverter circuit shown in FIG. 2(B) exhibits the voltage waveform and the current waveform shown in FIG. 4(B), with the difference in advantageous effects obtained by comparing the liquid crystal display device provided with the former inverter circuit and the liquid crystal display device provided with the latter inverter circuit, a following conclusion is obtained.

First of all, in the inverter circuit of this embodiment, the quantity of lamp current which passes the inside of the discharge tube LP during the burst Off period $T_{Imin}$ can be reduced compared to the quantity of lamp current which passes the inside of the discharge tube LP during the burst ON period $T_{Imax}$. Accordingly, it is concluded that the intensity of light radiated to the liquid crystal display panel is adjusted such that the region in the screen which is to be displayed brightly is displayed more brightly and the region in the screen which is to be displayed darkly is displayed more darkly. Further, in the inverter circuit of this embodiment, the discharge in the inside of the discharge tube LP during the burst ON period $T_{Imax}$ is made to reach the stationary state within 20 μsec from the start time of discharging in the inside of the discharge tube LP so that the there is no possibility that the lamp voltage $V_L$ is abnormally amplified. Accordingly, the amplitude change of the lamp voltage $V_L$ per unit time in the inverter circuit (secondary side) of this embodiment is gentler than the amplitude change of the lamp voltage $V_L$ in the inverter circuit shown in FIG. 2(B) and hence, the transformer circuit TRFM is not rapidly excited, whereby noises of the light source driving circuit DRV can be reduced to a level that the noises cannot be perceived.

Here, in FIG. 6, the performance of the technique on the improvement of light source which has been studied heretofore to reduce noises around the driving circuit DRV is explained for reference purpose. The graph indicated by a broken line together with black square plots shows the combination of the lamp voltage $V_L$ and the lamp current $I_L$ suitable for the stable self-sustaining discharge when a copper foil is arranged along the longitudinal direction outside a cold cathode fluorescent lamp (the discharge tube LP) (utilizing a proximity conductive body effect). The graph indicated by a solid line together with white circular plots shows the combination of the lamp voltage $V_L$ and the lamp current $I_L$ suitable for the stable self-sustaining discharge when a copper foil is set to the ground potential. Compared to the solid graph of this embodiment described together with black circular plots, both graphs are short along the lamp current $I_L$ axis. This implies that the dynamic range of the lamp current $I_L$ which stabilizes the self-sustaining discharge in the discharge tube LP using a proximity conductive body effect is narrow. This is attributed to a fact that the copper foil forms the large additional capacitance in the periphery of the discharge tube LP. As mentioned above, the broader the dynamic range of the lamp current for stabilizing the self-sustaining discharge of the discharge tube LP, the ratio of luminance modulation of the discharge tube LP can be increased. Accordingly, it is clearly understood from FIG. 6 that compared to the technique for suppressing noises in the periphery of the discharge tube LP using the proximity conductive body effect, the inverter circuit of this embodiment can remarkably enhance the performance of burst driving of the discharge tube LP.

Figure 8:
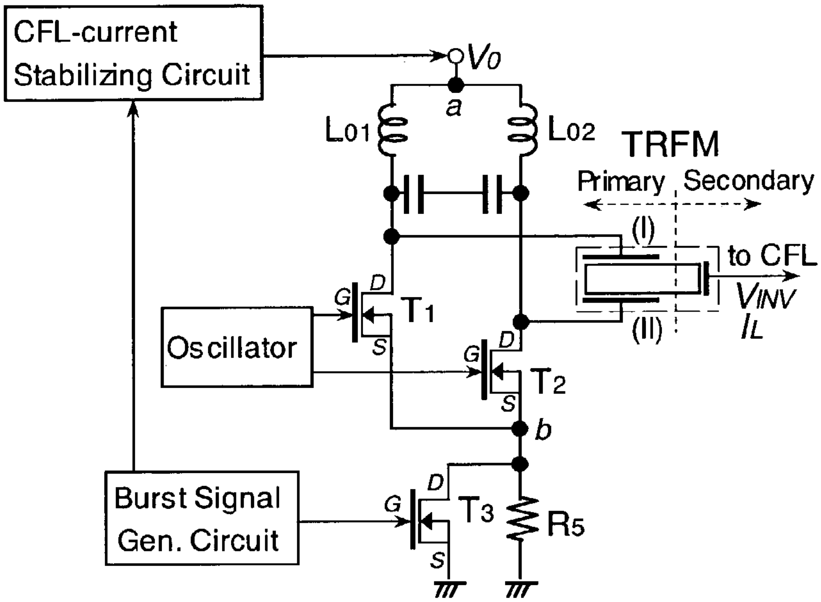
FIG. 8 is a circuit block diagram showing one example of an inverter circuit of the embodiment 1 of the liquid crystal display device according to the present invention in which switching elements are replaced with field effect transistors and a transformer circuit is replaced with a piezoelectric transformer.

In this embodiment, as shown in FIG. 1(A), the NPN-type bipolar transistor is used as the switching elements T1, T2 and T3. However, depending on the constitutions of the dimming circuit and the inverter circuit, the NPN-type bipolar transistor may be replaced with a PNP-type bipolar transistor shown in FIG. 1(D). Further, as shown in FIG. 8, the NPN-type bipolar transistor may be replaced with a field effect transistor (including a source region S, a gate region G and a drain region D). Since it is sufficient that the electric resistance between each of the switching elements T1, T2 and the ground potential (or the reference potential) can be varied between the burst ON period and the burst OFF period, the switching element T3 is not limited to the semiconductor device.

In this embodiment, a frame synchronizing signal which controls the video data transfer timing to the liquid crystal display panel for every frame period is inputted to the pulse shaping circuit together with the burst signal and the switching element T3 is controlled in an interlocking manner with the video data transfer. In controlling the light source driving circuit DRV in this manner, by matching the video display timing on the screen and the luminance modulating timing of the discharge tube LP for every frame period, it is possible to achieve both of the suppression of lowering of the luminance of the screen and the enhancement of the contrast of the image. However, even when the frame synchronizing signal is not inputted to the pulse shaping circuit or other circuit included in the light source driving circuit DRV and the burst driving control is performed independently from the video data transfer to the liquid crystal display panel, this does not obstruct the exercise of the present invention.

Further, as shown in FIG. 8, as the transformer circuit TFRM, in place of the leak magnetic flux type transformer shown in FIG. 1(A), it is possible to use a piezoelectric type transformer shown in FIG. 8 (see Japanese Unexamined Patent Publication 2000-78857). Still further, as shown in FIG. 8, without making the burst signal pass the pulse shaping circuit, the burst signal may be directly inputted to the switching element T3 and the CFL stabilizing circuit. Additionally, in the inverter circuit shown in FIG. 8, the resonance circuit shown in FIG. 1(A) which includes a tertiary coil $L_0$ may be used as an oscillator and a voltage signal supplied from the CFL stabilizing circuit may be alternately applied to gate regions G of the switching elements T1 and T2 formed of the field effect transistor.

Embodiment 2

Figure 9:
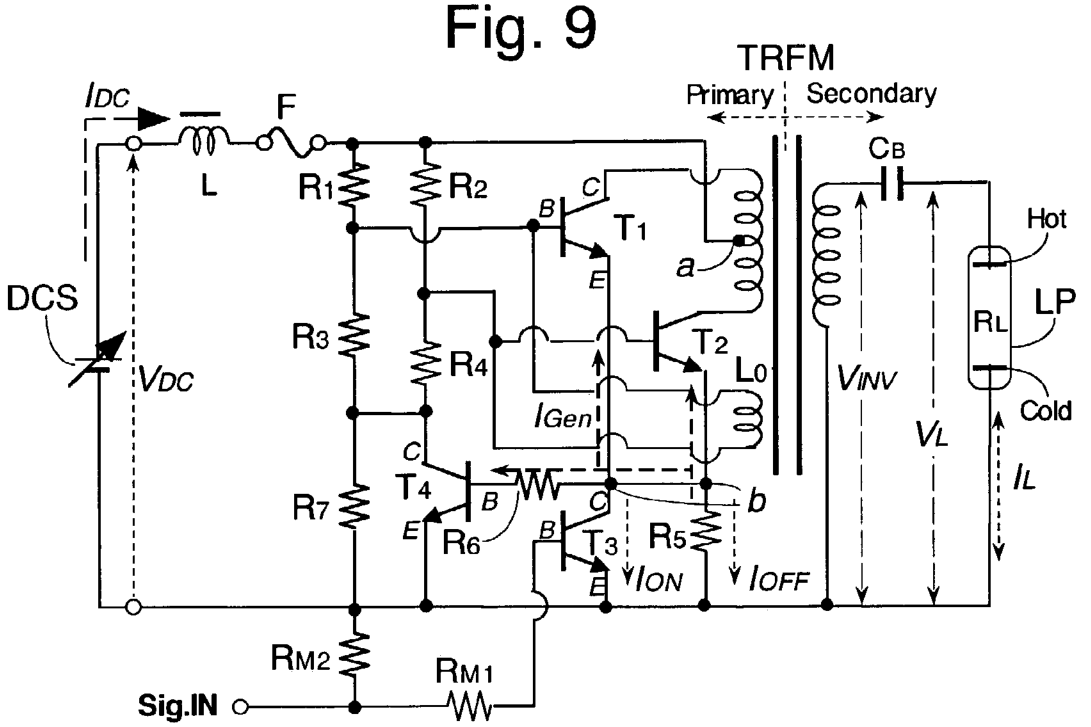
FIG. 9 is a circuit block diagram showing a light source driving circuit DRV of an embodiment 2 of the liquid crystal display device according to the present invention.

According to the liquid crystal display device of this embodiment, in the light source driving circuit DRV which is schematically shown in FIG. 9, base potentials of switching elements T1, T2 are modulated by a switching element T4. In the embodiment 1, the resistances R3, R4 are formed between the base potentials and the ground potentials (the reference potentials) of the switching elements T1, T2 so as to stabilize the base potentials. In this embodiment, at the ground potential side of the resistances R3, R4, the switching element T4 and a resistance R7 (a protective resistance) are further arranged in parallel. During the burst ON period, the base potentials of the switching elements T1, T2 are determined based on the ground potential (reference potential) using the resistance R3, the resistance R4 and the resistance R7. On the other hand, during the burst OFF period, the current $I_{Gen}$ flows into the base region of the switching element T4 from a point b where the potential is set higher than the ground potential (reference potential) using the current $I_{OFF}$ and the resistance R5 and makes the switching element T4 assume the ON state.

In this embodiment, the switching element T4 is also referred to as a feedback signal amplifying transistor. As can be clearly understood from the comparison between FIG. 1(A) and FIG. 9, the current $I_{Gen}$ which is generated during the burst OFF period, in case of FIG. 1(A), cannot reach the transformer circuit TRFM unless the current $I_{Gen}$ passes the current path of either one of the switching elements T1, T2. Since the switching elements T1, T2 assume the turn-OFF state during the burst OFF period, a threshold for generating a current which reaches the collector regions C by elevating the potentials of respective emitter regions E is high. Accordingly, it is difficult to deny the possibility that setting of conditions for making the inverter circuit function as a self-excited circuit during the burst OFF period becomes difficult.

To the contrary, in this embodiment, as shown in FIG. 9, the current is generated between the resistances R3, R4 and the ground potential (reference potential) through the switching element T4. Due to such a constitution, a signal which makes the switching elements T1, T2 alternately assume the ON state is generated by means of the resistances R3, R4 and the tertiary coil $L_0$. Accordingly, the current $I_{Gen}$ which is generated during the burst OFF period lowers, using the switching element T4, the hurdle to be overcome to form the current path reaching the transformer circuit TRFM via the switching elements T1, T2 by itself. In other words, setting of conditions for making the inverter circuit of this embodiment function as a self-excited circuit during the burst OFF period becomes considerably easy.

In this embodiment, the direct current source DCS is provided to the primary side of the light source driving circuit DRV and the low voltage side (the side connected to the cold side of the discharge tube LP) is set as the reference potential. Here, the reference potential indicates the low voltage side with respect to the direct voltage $V_{DC}$, the center of voltage amplitude or the side which exhibits the smaller value with respect to the alternating voltages $V_{INV}$, $V_L$. To the direct-current power source DCS, a PWM (Pulse Width Modulation) signal is inputted as the burst signal. The PWM signal chops the direct voltage VDC and the direct current IDC supplied to the inverter circuit through the inductance L and the fuse F. The duty of this chopping of direct voltage and direct current determines the luminance of the discharge tube LP.

The PWM signal is applied to the switching element T3 from a port Sig.IN such that the PWM signal is added to the frame synchronizing pulse signal (also referred to as “the vertical synchronizing pulse”) which controls the image data transfer to the liquid crystal display panel PNL. In this manner, by adding two kinds of signals which differ in characteristics, that is, the signal (the burst signal) which controls the luminance of the discharge tube Lp and the signal which controls the image display in the liquid crystal display panel, the driving of the light source device LUM is controlled such that the display image becomes more vivid.

Here, also with respect to the liquid crystal display device of this embodiment, advantageous effects which are comparable to the advantageous effects of the previous embodiment 1 such as the advantageous effect that the luminance of the whole screen is also enhanced while improving the contrast ratio of the display image are obtained. Further, noises generated from the light source device LUM including the light source driving circuit DRV can be suppressed to a level which does not give a discomfort to a user of the liquid crystal display device.

As can be clearly understood from the foregoing embodiments, the liquid crystal display device according to the present invention can enhance the contrast ratio of the display image compared to the conventional liquid crystal display device and, at the same time, can enhance the luminance of the whole screen. In this manner, according to the present invention, even with respect to the liquid crystal display device adopting the hold luminescence, it is possible to reproduce an animated television image with a clear profile comparable to that obtained by a cathode ray tube, whereby blurs which are liable to be generated on the motion picture can be remarkably reduced.

Further, the liquid crystal display device according to the present invention has succeeded in suppressing noises attributed to the alternating-current circuit system which has been claimed by users that they give a discomfort to human ears at the time of performing the burst operation of the light source device (including the light source driving circuit) incorporated in the liquid crystal display device so as to eliminate the image retention which is generated on the dynamic image display. Accordingly, by performing the burst operation of the light source device of the liquid crystal display device, it is possible to prolong the lifetime (particularly, the lifetime of the discharge tube such as the cold cathode fluorescent lamp or the like) and can realize the liquid crystal television set with small noises.

What is claimed is:

1. A liquid crystal display device comprising:

a liquid crystal display panel;

a light source device having a discharge tube; and a light source driving circuit driving the discharge tube which performs a blinking operation in synchronism with a frame period with only one ON period thereof in the frame period, said ON period of the blinking period being shorter than the frame period, wherein the light source driving circuit includes a primary side circuit receiving voltage pulses in synchronism with a burst signal which turns on and off alternately only during ON periods of the blink operation and stays off during OFF periods of the blink operation, and outputting a primary voltage, a frequency of the burst signal during the ON periods of the blink operation being higher than a frequency of the blinking operation, and lower than a frequency of a lamp current and a lamp voltage of the discharge tube, a transformer circuit boosting the primary voltage to an alternating voltage, and a secondary circuit applying the alternating voltage to the discharge tube, wherein the primary side circuit includes a first active element comprising a first terminal receiving the voltage pulses via a first resistor, and a second terminal connected to one end of the transformer circuit, a second active element comprising a first terminal receiving the voltage pulses via a second resistor, and a second terminal connected to the other end of the transformer circuit, and a third active element comprising a first terminal connected to a third terminal of the first active element and a third terminal of the second active element, and a second terminal connected to a reference voltage, and the third active element turning on in a burst-on period of the burst signal and turning off in a burst-off period of the burst signal, wherein voltage amplitudes applied to the discharge tube during the burst-off period are greater than voltage amplitudes applied during the burst-on period, and wherein current amplitudes applied to the discharge tube during the burst-off period are greater than zero, and smaller than current amplitudes applied during the burst-on period.

2. A liquid crystal display device according to claim 1, further comprising a passive element connected between the first terminal of the third active element and the reference voltage.

3. A liquid crystal display device according to claim 2, wherein the third active element turns on in synchronism with the burst signal and the frame synchronizing pulse signal.

4. A liquid crystal display device according to claim 3, wherein the discharge tube emits light during the burst-off period.

5. A liquid crystal display device according to claim 4, wherein the primary side voltage is generated by alternate switching operations of the first active element and the second active element.

6. A liquid crystal display device according to claim 5, wherein the first terminal of the first active element and the first terminal of the second active element are connected via a coil.

7. A liquid crystal display device according to claim 1, wherein the first terminal of the first active element and the first terminal of the second active element are connected via a coil.

8. A liquid crystal display device according to claim 7, wherein the third active element turns on in synchronism with the burst signal and the frame synchronizing pulse signal.

9. A liquid crystal display device according to claim 8, wherein, the discharge tube emits light during the burst-off period.

10. A liquid crystal display device according to claim 1, wherein the discharge tube emits light during the burst-off period.

11. A liquid crystal display device according to claim 10, wherein the first terminal of the first active element and the first terminal of the second active element are connected via a coil.

12. A liquid crystal display device according to claim 11, wherein the third active element turns on in synchronism with the burst signal and the frame synchronizing pulse signal.

13. A liquid crystal display device according to claim 1, wherein said ON period of the blinking operation is half of the frame period.

14. A liquid crystal display device according to claim 1, wherein the lump current and the lamp voltage of the discharge tube are in synchronism with the blinking operation.

* * * * *